Patented Oct. 18, 1949

2,485,168

UNITED STATES PATENT OFFICE 2,485,168

MANUFACTURE OF METAL-FREE PHTHALOCYANINE

William Llewlyn Rintelman, Glassboro, N. J., assignor to E. I. du Pont de Nemours & Company, Wilmington, Del., a corporation of Delaware No Drawing. Application April 1, 1948, Serial No. 18,492

5 Claims. (Cl. 260—314.5)

This invention relates to the production of metal-free phthalocyanines. More particularly, this invention deals with an improved catalytic process for making metal-free phthalocyanines directly from the corresponding phthalonitriles.

Metal-free phthalocyanine, which is the common name for what is strictly speaking dihydrogen-phthalocyanine, has heretofore been prepared by two principal methods. In the indirect method, a metal phthalocyanine is first formed and the metal is then replaced by hydrogen by special treatment. Thus, in Thorpe et al., U. S. P. 2,000,051, metal-free phthalocyanine was produced from ortho-cyanobenzamide by preparing first magnesium phthalocyanine and treating the latter with concentrated sulfuric acid. According to the same patent, if antimony is employed in the synthesis in lieu of magnesium, metal-free phthalocyanine results directly. In U. S. P. 2,000,052, the same pigments were prepared from magnesium and antimony, respectively, using phthalimide in lieu of o-cyanobenzamide.

In U. S. P. 2,202,632 issued to Heilbron et al., phthalonitrile is employed as initial material; but this is converted first into the phthalocyanine of calcium, barium, magnesium, cadmium or beryllium by reaction with the respective metal or an oxide or salt thereof, and the metal phthalocyanine is then converted into the metal-free compound by treatment with concentrated sulfuric acid.

In Dent's U. S. P. 2,214,454, a commercial process for manufacturing metal-free phthalocyanine is proposed wherein phthalonitrile is first converted into sodium- or potassium-phthalocyanine by reaction with the respective metal in boiling amyl alcohol, according to U. S. P., 2,116,602, and the pigment is then extracted with methyl alcohol and water, resulting in the metal-free compound.

In the second principal method, attempts have been made to prepare dihydrogen-phthalocyanine directly from phthalonitrile or other phthalocyanine-yielding intermediates, by the aid of catalysts. The first attempt along these lines I find in Heilbron et al., U. S. P. 2,116,602, wherein the reaction was carried out in quinoline or dimethylaniline as a solvent, and ammonia was employed as catalyst.

An attempt was also indicated there at converting molten phthalonitrile into pigment in the absence of a solvent, but using ammonia as catalyst.

A second attempt wherein no solvent was employed, was indicated in Lowe's U. S. P. 2,155,054. Here, the phthalonitrile was fused, and mono-, di- or triethanol amine was employed as catalyst. Still a different solvent-free procedure was described by Palmer and Gross U. S. P. 2,413,191, wherein the initial material was ground dry in the presence of an alkali-metal or alkaline-earth hydroxide, using methylglucamine as catalyst.

All the above procedures nevertheless suffer from poor yields, poor quality of the product, or else too many manipulative steps which render the process costly on a large scale.

Accordingly, it is an object of this invention to provide an improved process for producing metal-free phthalocyanine by a direct method and using inert organic solvents. A further object is to provide a process for the commercial production of metal-free phthalocyanine in good yield and high quality. A still further object is to produce metal-free phthalocyanine by a process which results in a crystalline product contained in an organic liquid, whereby recovery may be effected directly by the simple process of filtration and washing. Other and further important objects of this invention will appear as the description proceeds.

In my copending application of even date herewith, Serial No. 18,491, now U. S. Patent 2,485,167, a method is proposed for achieving the above objects by carrying out the synthesis from standard material, to wit phthalonitrile or a substitution derivative thereof, using an inert organic solvent, for instance trichloro benzene, and using as catalyst a limited quantity of an organic nitrogenous base whose dissociation constant K has a value between $2 \times 10^{-4}$ and $2 \times 10^{-3}$. The reaction temperature employed there is between 185° and 230° C.

Now I find that the above process can be further improved by selecting piperidine or a homolog thereof as the base and adding to the reaction mass a relatively small quantity of ethylene glycol in conjunction with a small quantity of an alkali-metal carbonate. The advantages gained thereby is that the reaction temperature may be considerably reduced, resulting in a product of superior quality. Also, lower boiling solvents may be employed, without resort to pressure.

The quantity of piperidine or its homolog to be employed according to this invention is preferably kept between about 7 and 20 parts by weight for each 100 parts of o-arylene dicyanide employed. The quantity of ethylene glycol may be about 2 to 7 parts on the same scale, while the quantity of carbonate is of the order of 0.5 to 5% based on the weight of the dicyanide. The preferred temperature of reaction is in the range of 160 to 180° C.

Apart from the above limitations as to the nature of the catalysts and their quanties, the reaction in my improved process may follow standard practice. For instance, the quantity of solvent may be any convenient quantity sufficient to dissolve the initial phthalonitrile. As such solvent, any inert, water-immiscible organic liquid which is a solvent for the o-arylene dicyanide selected, may be employed, for instance trichloro-benzene, dichlorobenzene, benzene, toluene, solvent naphtha, cyclohexanol or molten naphthalene; and where the boiling point of the organic solvent is lower than the desired reaction temperature, the reaction may be carried out under autogenous pressure in a closed vessel.

The process may be applied to phthalonitrile itself, to produce metal-free phthalocyanine; or it may be applied to substitution derivatives or phthalonitrile to produce correspondingly substituted metal-free phthalocyanines. As instances of such substituted phthalonitriles may be mentioned: 3- or 4-chloro-phalonitrile, 4,5-dichlorophthalonitrile, 3- or 4-nitro-phthalonitrile, the cyano-phthalonitriles, the mercapto-phthalonitriles, methyl-phthalonitriles, phenyl-phthalonitrile, etc.

The recovery of the dyestuff in my improved process may be effected by filtering off or steam distilling off the solvent, which simultaneously carries off with it the catalysts and any residual phthalonitrile. In general, the recovery may follow any of the procedures employed in this connection in the art heretofore.

Without limiting my invention, the following examples are given to illustrate my preferred mode of operation. Parts mentioned are by weight.

Example 1

1,200 parts of phthalonitrile are dissolved in 3,000 parts of ortho-dichlorbenzene at 155°–165° C. and held at this temperature until all traces of moisture have been driven off. Then 12 parts of potassium carbonate are added, followed by 103 parts of piperidine. The mass is stirred at this temperature for 10 to 30 minutes. 44.4 parts of ethylene glycol are then slowly added (over 1–2 hour period). The temperature rises during this addition to 170°–175° C. as the reaction proceeds. The temperature is held between 170°–175° C. for 12 to 16 hours longer and then cooled to 100° C. The thick magma is filtered off with suction, washed 4 times with dichlorbenzene, and then dried in an air oven at 100–120° C. The color is obtained in crystalline form, in a high state of purity, and in a yield of 78–81%.

Instead of drying the cake directly, the residual solvent may be removed by an alcohol wash or it may be removed by steam distillation and then dried.

Instead of piperidine in the above example, alpha-pipecoline may be used, without any difference in yield and quality of the product.

Example 2

100 parts of phthalonitrile, 1 part of potassium carbonate, 8.6 parts of piperidine, 3 parts of ethylene glycol, and 300 parts of cyclohexanol are heated at 160°–165° C., under gentle reflux, for 20 to 30 hours. The reaction mass is then filtered at 140–160° C. with suction, and washed with hot cyclohexanol until the filtrate is colorless. The adhering cyclohexanol is then washed out with ethyl alcohol, and the cake is dried. The yield of pure color crystals obtained is about 73 to 75%.

Example 3

A mixture of 150 parts of 4-nitro-phthalonitrile and 585 parts of o-dichlorobenzene was heated for 1 hour at 120° C. The temperature was raised to 160° C., and 12.8 parts of piperidine, 1.2 parts of potassium carbonate and 5.0 parts of ethylene glycol were added in the order named. The mixture was heated to 177°±2° C. and held there for 18 hours. The product was cooled to 125° C., filtered, washed with hot o-dichlorobenzene and alcohol and dried to give 114 parts of a product consisting mainly of tetra-(4)-nitro-dihydrogen-phthalocyanine.

It will be understood that the details of procedure may be varied within wide limits, without departing from the spirit of this invention. Thus, in lieu of potassium carbonate, sodium carbonate may be employed.

The metal-free phthalocyanine obtained by this invention may be used for the preparation of high quality pigment pastes and powders, for use in printing inks, in textile dyeing, in paper coloring, etc.

My invention furnishes a more economical process of preparing a very pure product in higher yields than heretofore realized. It also has the advantage of giving material having a much greener and brighter shade than that previously obtained.

I claim as my invention:

1. A process for the manufacture of a metal-free phthalocyanine, which comprises heating an orthoarylene dicyanide of the benzene series in an inert organic solvent and in the presence of an organic nitrogenous base selected from the group consisting of piperidine and the pipecolines, and in the further presence of glycol and of an alkali-metal carbonate.

2. A process as in claim 1, wherein the quantity of nitrogenous base selected is not over 20% by weight of the orthoarylene dicyanide, and the quantity of the glycol is not over 7% by weight on the same basis.

3. A process as in claim 2, wherein the reaction is conducted at a temperature not exceeding 180° C.

4. A process for the manufacture of a metal-free phthalocyanine which comprises heating an orthoarylene dicyanide of the benzene series at a temperature between 160° and 180° C. in an inert organic solvent, in the presence of a nitrogenous base selected from the group consisting of piperidine and the pipecolines taken in quantity of from 7 to 20% by weight of the orthoarylene dicyanide being treated, and in the further presence of from 2 to 7% by weight of ethylene glycol and from 0.5 to 5% of an alkali metal carbonate, the percentages being based on the weight of the orthoarylene dicyanide.

5. The process of preparing metal-free phthalocyanine, which comprises heating substantially 100 parts by weight of phthalonitrile, at 160° to 180° C., in a quantity of o-dichlorobenzene sufficient to dissolve the same, and in the further presence of from 7 to 20 parts of piperidine, from 2 to 7 parts of ethylene glycol and about 1 part of potassium carbonate, and recovering the crystalline color thus obtained.

WILLIAM LLEWLYN RINTELMAN.

REFERENCES CITED

The following references are of record in the file of this patent:

UNITED STATES PATENTS

| Number | Name | Date |
|---|---|---|
| 2,155,054 | Lowe | Apr. 18, 1939 |